US011255216B2

United States Patent
Chong (10) Patent No.: US 11,255,216 B2
(45) Date of Patent: Feb. 22, 2022

(54) ELECTRIC MACHINE

(71) Applicant: ROLLS-ROYCE plc, London (GB)

(72) Inventor: Ellis F H Chong, Derby (GB)

(73) Assignee: ROLLS-ROYCE PLC, London (GB)

( * ) Notice: Subject to any disclaimer, the term of this patent is extended or adjusted under 35 U.S.C. 154(b) by 284 days.

(21) Appl. No.: 16/734,531

(22) Filed: Jan. 6, 2020

(65) Prior Publication Data
US 2020/0224547 A1 Jul. 16, 2020

(30) Foreign Application Priority Data

Jan. 11, 2019 (GB) ..................................... 1900378

(51) Int. Cl.
*H02K 1/12* (2006.01)
*H02K 1/27* (2006.01)
(Continued)

(52) U.S. Cl.
CPC ............ *F01D 15/10* (2013.01); *B64D 27/10* (2013.01); *F01D 5/04* (2013.01); *F04D 29/324* (2013.01);
(Continued)

(58) Field of Classification Search
CPC . F01D 5/04; F01D 15/10; B64D 27/10; F04D 29/324; H02K 1/12; H02K 1/276;
(Continued)

(56) References Cited

U.S. PATENT DOCUMENTS

| 4,720,640 A | 1/1988 | Anderson et al. |
| 4,722,668 A | 2/1988 | Novacek |

(Continued)

FOREIGN PATENT DOCUMENTS

| CN | 104 836 482 A | 8/2015 |
| JP | H05-219666 A | 8/1993 |
| WO | WO2014196981 A1 | 12/2014 |

OTHER PUBLICATIONS

Search Report of the Intellectual Property Office of the United Kingdom for GB1900378.9 with search date of Jun. 18, 2019; Combined Search and Examination Report of the Intellectual Property Office of the United Kingdom for GB1900378.9 with report dated Jun. 19, 2019.

(Continued)

*Primary Examiner* — Pedro J Cuevas
(74) *Attorney, Agent, or Firm* — Oliff PLC (57) ABSTRACT

An electric machine (212) comprises a turbomachine rotor (203) having a hub (302) and an axis of rotation (A-A) about which the turbomachine rotor is arranged to rotate. The turbomachine rotor includes a plurality of blades (301). Each blade has a root (303) attached to the hub, a tip (304) remote from the hub, a leading edge (305) and a trailing edge (306), a pressure side and a suction side (307). A stator (502) is located circumferentially around the turbomachine rotor. Each blade further comprises a rotor element at the tip comprising a permanent magnet having a first pole (401) and a second pole (402), the first pole being located adjacent the suction side of the blade and the second pole being located adjacent the pressure side such that a magnetic flux path extends perpendicularly through the blade tip.

17 Claims, 9 Drawing Sheets

(51) Int. Cl.
    *H02K 21/14* (2006.01)
    *H02K 7/18* (2006.01)
    *F04D 29/32* (2006.01)
    *F01D 15/10* (2006.01)
    *B64D 27/10* (2006.01)
    *F01D 5/04* (2006.01)
    *H02K 1/276* (2022.01)

(52) U.S. Cl.
    CPC ............... *H02K 1/12* (2013.01); *H02K 1/276* (2013.01); *H02K 7/1823* (2013.01); *H02K 21/14* (2013.01); *F05D 2220/36* (2013.01); *F05D 2220/76* (2013.01); *F05D 2220/768* (2013.01); *F05D 2240/307* (2013.01); *Y02T 50/60* (2013.01)

(58) Field of Classification Search
    CPC .. H02K 7/1823; H02K 21/14; F05D 2220/36; F05D 2220/76; F05D 2220/768; F05D 2240/307; Y02T 50/60
    See application file for complete search history.

(56) References Cited

U.S. PATENT DOCUMENTS

| | | | | |
|---|---|---|---|---|
| 4,953,811 A * | 9/1990 | Smith | ...................... | B64C 27/82 244/17.19 |
| 5,220,231 A * | 6/1993 | Veronesi | ................... | B63H 1/16 310/90 |
| 5,607,329 A * | 3/1997 | Cho | .......................... | B63H 1/16 310/266 |
| 5,702,273 A * | 12/1997 | Cho | .......................... | B63G 8/08 114/337 |
| 6,729,140 B2 * | 5/2004 | Care | .......................... | F01D 5/14 290/52 |
| 6,806,586 B2 * | 10/2004 | Wobben | ................ | F03B 13/264 290/54 |
| 6,809,444 B1 * | 10/2004 | Gieseke | ................... | B63G 8/08 310/67 R |
| 7,385,303 B2 * | 6/2008 | Roos | ........................ | F01D 15/10 290/54 |
| 7,417,334 B2 * | 8/2008 | Uchiyama | ................ | F03D 13/20 290/55 |
| 7,514,810 B2 | 4/2009 | Kern et al. | | |
| 7,603,864 B2 | 10/2009 | Gemin et al. | | |
| 7,605,486 B2 * | 10/2009 | Bridwell | ................ | F03B 17/061 290/43 |
| 7,944,069 B2 * | 5/2011 | Uchiyama | ................ | H02K 7/183 290/44 |
| 7,952,244 B2 * | 5/2011 | Colin | ...................... | H02K 21/14 310/67 R |
| 8,299,669 B2 * | 10/2012 | Gieras | .................... | B63H 23/24 310/87 |
| 8,674,538 B2 * | 3/2014 | Lugg | ...................... | F03D 1/0666 290/55 |
| 9,143,023 B1 * | 9/2015 | Uskert | ...................... | H02K 1/12 |
| 10,240,477 B2 | 3/2019 | Ettridge et al. | | |
| 10,941,707 B1 * | 3/2021 | Berkey | .................... | F02K 3/06 |
| 2005/0147501 A1 | 7/2005 | Cheng et al. | | |
| 2008/0120980 A1 * | 5/2008 | Gemin | .................... | F01D 15/10 60/802 |
| 2009/0115295 A1 | 5/2009 | Colin | | |
| 2011/0031760 A1 * | 2/2011 | Lugg | .................... | H02K 7/1869 290/55 |
| 2012/0093669 A1 * | 4/2012 | Gieras | .................... | B63H 23/24 417/423.3 |
| 2016/0123174 A1 | 5/2016 | Ettridge et al. | | |
| 2016/0319845 A1 * | 11/2016 | Molnar | .................... | F01D 17/24 |
| 2017/0198701 A1 | 7/2017 | Sarlioglu et al. | | |
| 2021/0114740 A1 * | 4/2021 | Berkey | .................... | B64C 11/06 |

OTHER PUBLICATIONS

May 15, 2020 extended Search Report issued in European Patent Application No. 19216658.5.

Nov. 4, 2021 Search Report issued in European Patent Application No. 19216658.5.

* cited by examiner

ELECTRIC MACHINE

CROSS-REFERENCE TO RELATED APPLICATIONS

This specification is based upon and claims benefit of priority from United Kingdom patent application number GB 1900378.9 filed on Jan. 11, 2019, the entire contents of which are incorporated herein by reference.

TECHNICAL FIELD

The present disclosure relates to electric machines.

BACKGROUND

Figure 1:
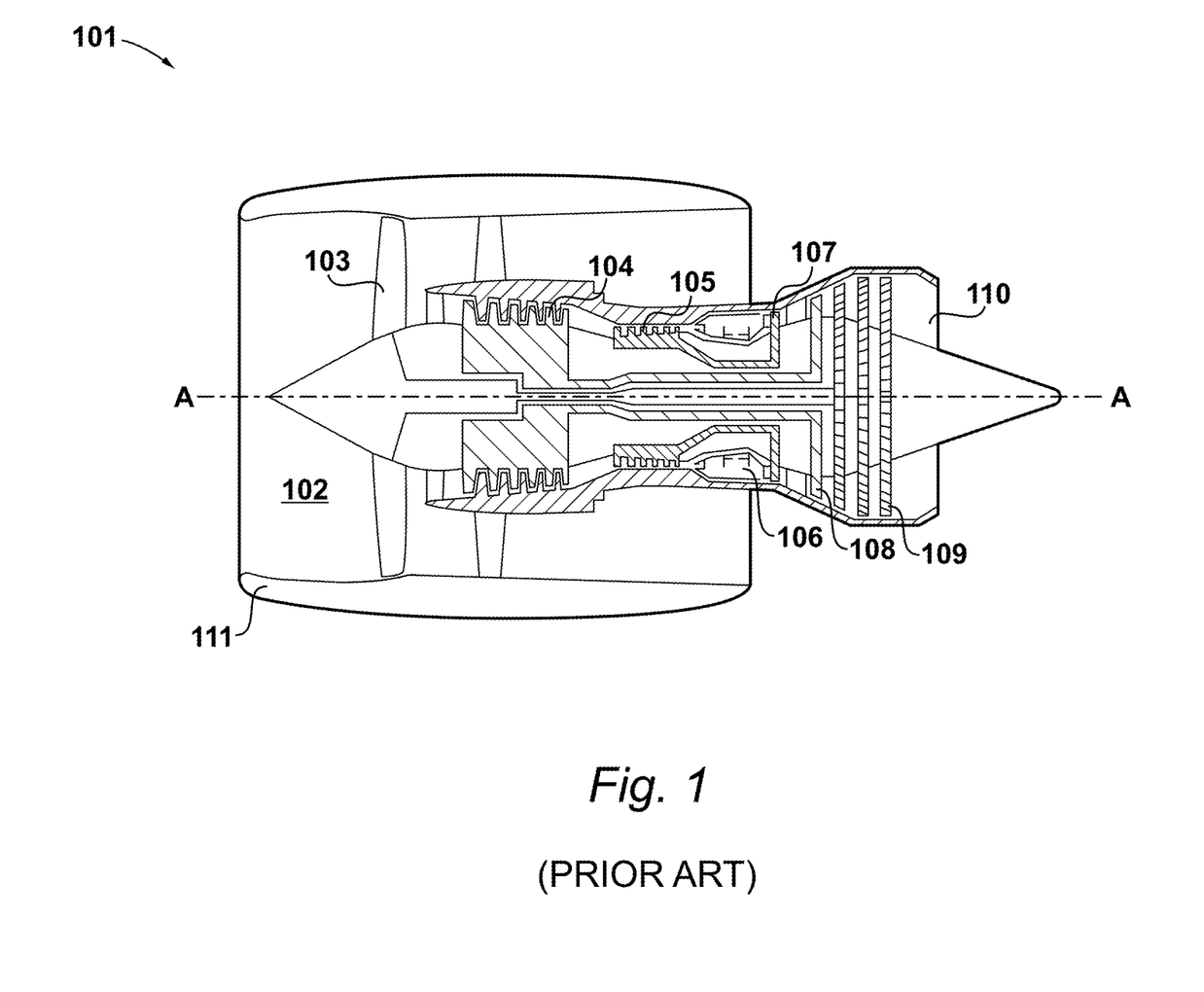
FIG. 1 is a sectional side view of a prior art gas turbine engine.

With reference to FIG. 1, a prior art three-shaft turbofan engine is generally indicated at 101, having a principal and rotational axis A-A. The engine 101 comprises, in axial flow series, an air intake 102, a propulsive fan 103, an intermediate pressure compressor 104, a high-pressure compressor 105, a combustor 106, a high-pressure turbine 107, an intermediate pressure turbine 108, a low-pressure turbine 109 and an exhaust nozzle 110. A nacelle 111 generally surrounds the engine 101 and defines both the intake 102 and the exhaust nozzle 110.

The engine 101 works in a conventional manner so that air entering the intake 102 is accelerated by the fan 103 to produce two air flows: a first air flow which passes through a bypass duct 22 to provide propulsive thrust, and a second air flow into the intermediate pressure compressor 104. The intermediate pressure compressor 104 compresses the air flow directed into it before delivering that air to the high-pressure compressor 105 where further compression takes place.

The compressed air exhausted from the high-pressure compressor 105 is directed into the combustor 106 where it is mixed with fuel and the mixture combusted. The resultant hot combustion products then expand through, and thereby drive the high-pressure, intermediate-pressure, and low-turbines 107, 108, 109 before being exhausted through the nozzle 20 to provide additional propulsive thrust. The high—107, intermediate—108 and low—109 pressure turbines drive, respectively, the high-pressure compressor 105, intermediate-pressure compressor 104 and fan 103, each by suitable interconnecting shaft.

In order to start the engine 101, the high-pressure spool is typically put into rotation by an external power source. Such a power source may be an electric machine operated as an electric motor, or an air turbine starter.

Once sufficient mass flow is generated by the high-pressure compressor 105, fuel may be injected and ignited and combustion started in a process known as light-off. The exhaust from the combustor 106 then drives the turbines 107, 108, 109, and the external power source can be switched off.

Typically, the function of a gas turbine engine is not only to provide an aircraft with thrust, but also to provide the aircraft with electrical power. To this end an electrical generator is often coupled to the gas turbine engine. The generator converts a fraction of the mechanical power generated by the gas turbine engine into electricity for use by the aircraft.

Such starter-generators are not usually situated within the engine core of the gas turbine engine. Rather, the starter-generator typically forms part of the accessory gearbox which is connected to the engine via a radial driveshaft. Such an arrangement introduces additional weight and length to the engine design.

United States Patent Publication No 2009/0115295 describes an electricity generator comprising permanent magnets fastened to the end of blades a fan of a gas turbine engine, and a stator located within the fan casing. Such a generator is stated as being not suitable for use as an electric motor for starting the gas turbine engine.

U.S. Pat. No. 7,514,810 describes a gas turbine engine including an aft turbine downstream of the low-pressure turbine. A generator is disposed aft of the aft turbine.

U.S. Pat. No. 7,603,864 describes an electromagnetic machine having rotor poles on the tips of fan blades and stator elements placed circumferentially around the fan. The electric machine has a transverse flux configuration, in which the stator elements each comprise a generally C-shaped core. The C-shaped cores are located around the fan blade tips such that when a core is adjacent a blade tip a magnetic flux path passes through the C-shaped core, across an air gap between the core and the bad tip, and transversely through the rotor pole located on the blade tip, so forming a closed loop.

SUMMARY

According to a first aspect there is provided an electric machine comprising:

a turbomachine rotor having a hub and an axis of rotation about which the turbomachine rotor is arranged to rotate;

a plurality of blades, each blade having a root attached to the hub, a tip remote from the hub, a leading edge and a trailing edge, and a pressure side and a suction side;

a plurality of rotor elements, each rotor element located at the tip of one of the plurality of blades; and a stator located circumferentially around the turbomachine rotor;

wherein each rotor element comprises a permanent magnet having a first pole and a second pole, the first pole being located adjacent the pressure side of the blade and the second pole being located adjacent the suction side of the blade such that a magnetic flux path extends perpendicularly through the blade tip.

The first pole may be a north pole and the second pole may be a south pole, such that the magnetic flux path extends perpendicularly through the blade tip from the suction side of the blade to the pressure side.

Each blade may be of aerofoil cross section and thus for each radial position thereof define a chord line. As used herein, the term "chord line" means the straight line connecting leading and trailing edges of a blade Each rotor element may be located at its respective blade tip such that the magnetic flux lines due to the permanent magnet are perpendicular to the chord line at the tip of the blade.

As used herein, the term "stagger angle" means the angle between the chord line and the axial direction defined by the axis of rotation. Thus the stagger angle of a rotor element may be substantially the same as the stagger angle of the blade tip in which that rotor element is located.

The stator may comprise a plurality of stator windings. Each of the stator windings may be aligned such that they are substantially parallel to the chord line. Alternatively, each of the stator windings may be located at an angle to the chord line, for example within ±5 degrees of the chord line, ±10 degrees, ±20 degrees or ±30 degrees of the chord line.

The stator windings may be wound around a non-magnetic former.

The electric machine may further comprise a casing. The stator may be located within the casing.

The electric machine may further comprise a magnetic ring located circumferentially around the stator.

Each rotor element may be embedded within its respective blade such that the rotor element does not disrupt the aerodynamic shape of the blade.

Each blade may comprise a rotor element.

The turbomachine rotor may be a fan in a turbofan gas turbine engine, a hybrid turbofan gas turbine engine or an electric ducted fan.

The electric machine may be operable to drive the fan.

Alternatively, or additionally, the electric machine may be operable to generate electricity from the turbomachine rotor.

According to a second aspect there is provided a propulsor for producing thrust to propel an aircraft, the propulsor comprising an electric machine according to the first aspect.

The propulsor may be a turbofan engine, and the turbomachine rotor within the electric machine may form the fan of the turbofan engine.

The propulsor may be an electric ducted fan, and the turbomachine rotor within the electric machine may form the fan thereof.

BRIEF DESCRIPTION OF THE DRAWINGS

Embodiments will now be described by way of example only with reference to the accompanying drawings, which are purely schematic and not to scale, and in which.

DETAILED DESCRIPTION

As set out above, the electric machines disclosed herein comprise a turbomachine rotor stage, a plurality of rotor elements, each rotor element located at the tip of one of the plurality of blades, and a stator located circumferentially around the turbomachine rotor.

Figure 2:
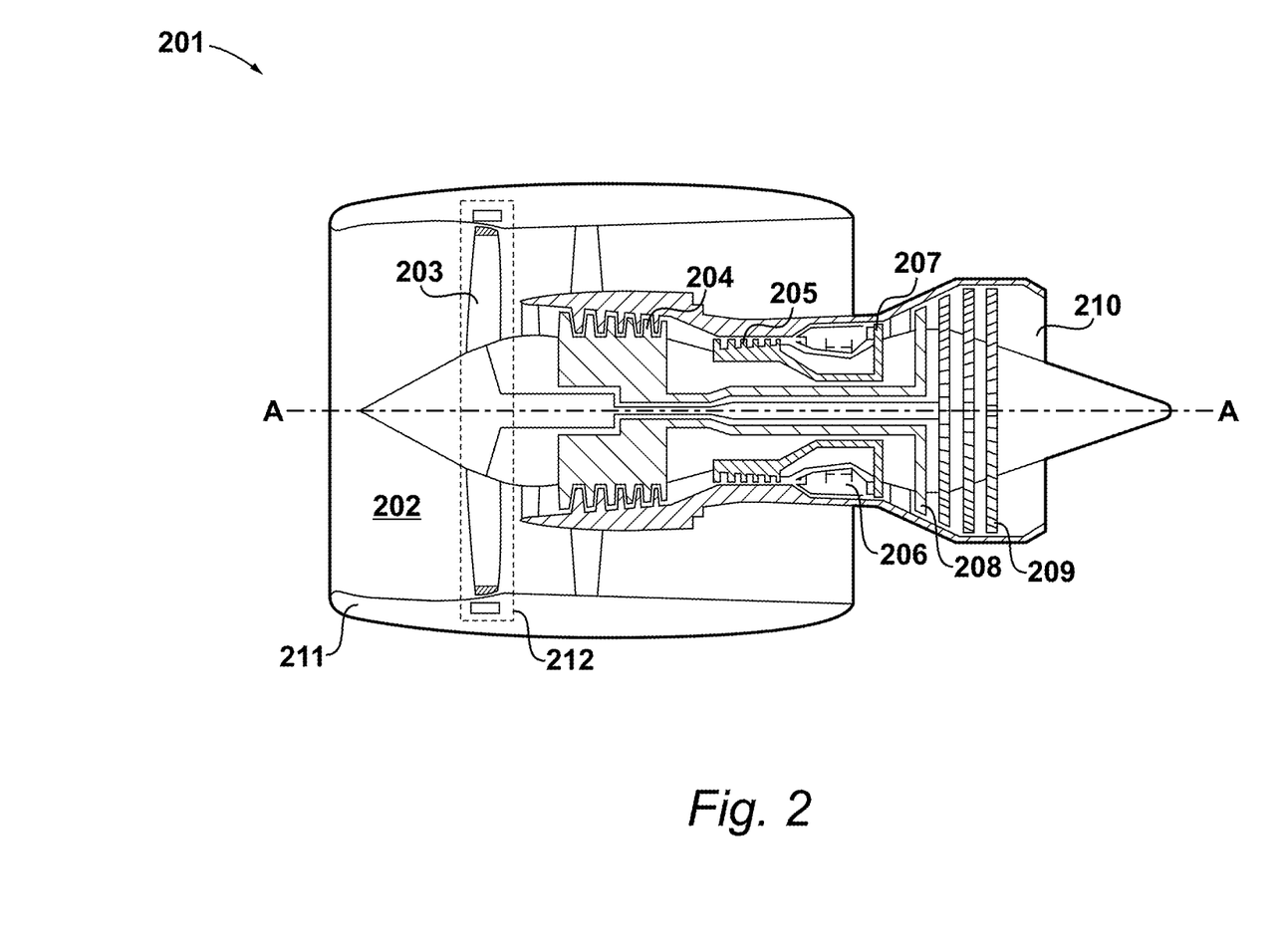
FIG. 2 is a sectional side view of a propulsor incorporating an electric machine of the type set out above.

FIG. 2 illustrates a propulsor for producing thrust to propel an aircraft comprising such an electric machine in the form of a turbofan engine 201. The gas turbine architecture of the turbofan engine 201 of the present embodiment is substantially similar to the prior art turbofan engine 101, and thus like components are identified with like numerals incremented by one hundred, and the rotational axis is again identified as A-A.

The electric machine is identified at 212. In this example the turbomachine rotor stage is the fan 203. In alternative configurations, the turbomachine rotor stage may be a rotor stage in another part of the turbomachinery of the engine 201, for example the intermediate-pressure compressor 204 or high-pressure compressor 205.

Figure 3:
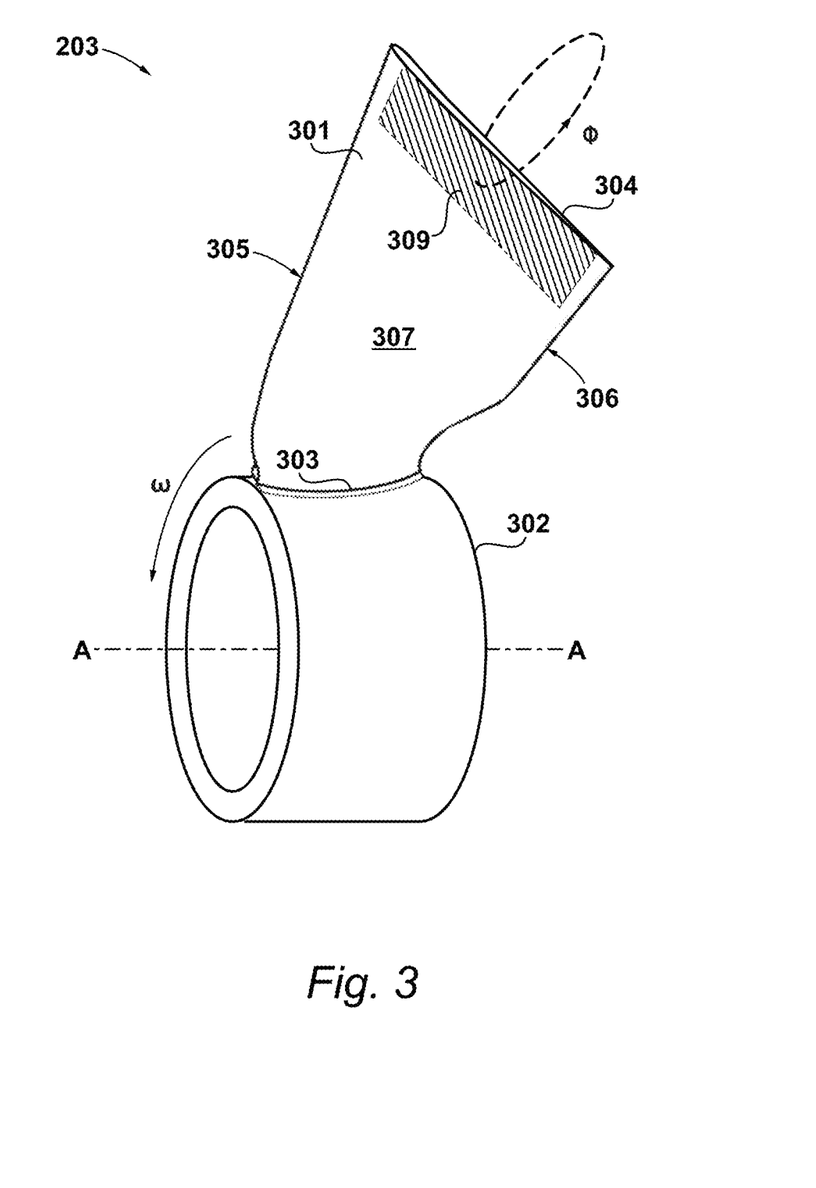
FIG. 3 shows the fan of the propulsor of FIG. 2.

FIG. 3 illustrates the fan 203 in isolation. A plurality of fan blades 301 are comprised within the fan 203, although only one is shown in the Figure for clarity. It will be appreciated that in practice the fan 203 will contain a plurality of fan blades 301, e.g. 16, 18, 20, 22, or 24 blades. The fan blades 301 are attached to a hub 302. In operation, the fan 203 rotates around the rotational axis A-A in a direction $\omega$.

Thus, it will be understood that in general a turbomachine rotor, whether it be a fan, a compressor stage, or a turbine stage, will comprise a hub with blades and an axis of rotation about which the turbomachine rotor is arranged to rotate.

Referring again to FIG. 3, each fan blade 301 has a root 303 attached to the hub 302, a tip 304 remote from the hub 302, a leading edge 305, and a trailing edge 306.

A first face 307 is defined between the leading edge 305 and the trailing edge 306. The first face 307 forms one of the gas-washed portions of the blade, in particular the suction side of the blade. Similarly, a second face (308, FIG. 4) different to the first face is also defined between the leading edge and the trailing edge. The second face forms the other of the gas-washed portion of the blade, in particular the pressure side of the blade.

The electric machine 212 further includes a plurality of rotor elements 309, which together form a rotor portion of the electric machine. Each rotor element 309 is located at the tip 304 of one of the plurality of fan blades 301. In an embodiment, all of the fan blades 301 include a rotor element 309. In an alternative embodiment, not all of the fan blades 301 include a rotor element 309. For example, there may be an even number of fan blades 301, and every other fan blade may include a rotor element. Other fractional distributions of rotor elements are of course possible.

Figure 4:
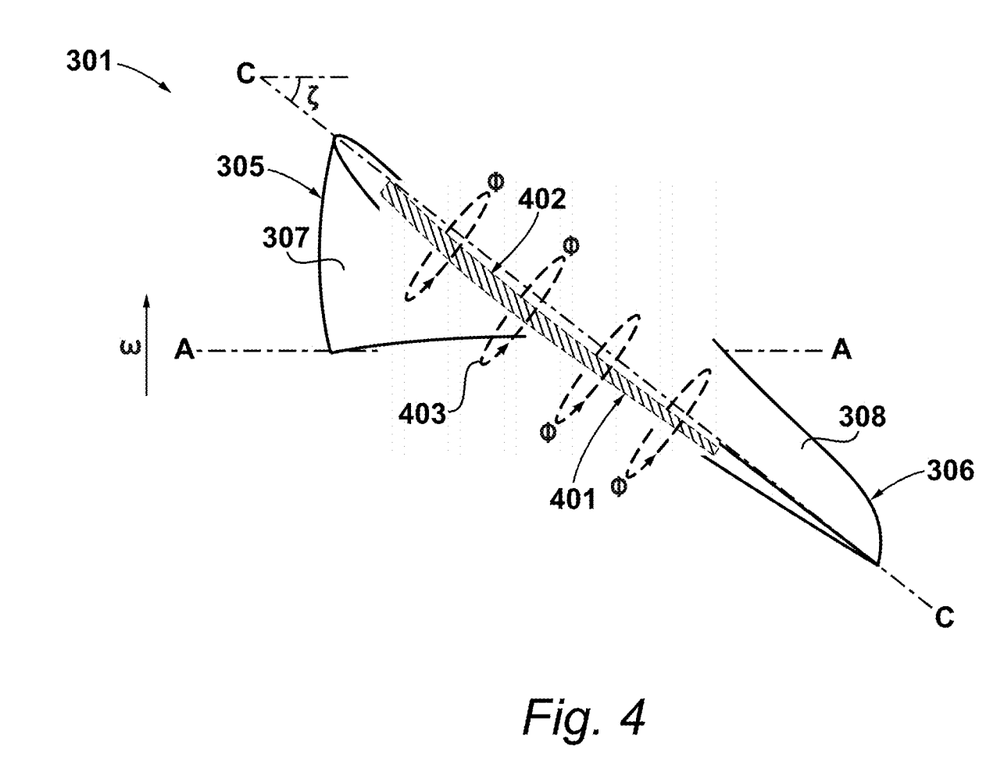
FIG. 4 shows the tip of the fan blade of FIG. 3.
Figure 6:
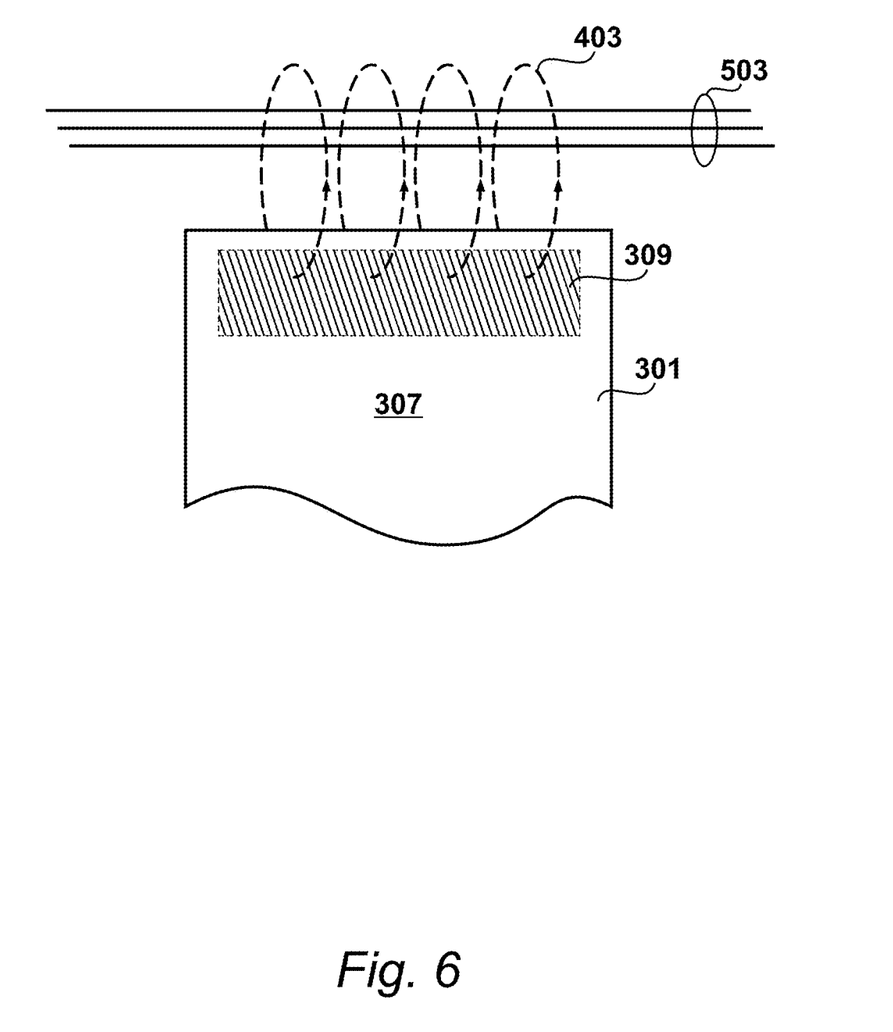
FIG. 6 shows the magnetic interaction between the fan blade and stator windings.

FIG. 4 is a view of the tip 304 of a fan blade 301. Each rotor element 309 comprises a permanent magnet having a first pole 401 and a second pole 402. The permanent magnet is oriented such that the first pole 401 is located adjacent the first face 307 (the suction side) of the fan blade 301, and the second pole 402 is located adjacent the second face (the pressure side) of the fan blade 301 (FIG. 6). This results in a magnetic flux path ($\Phi$) 403 that extends in a direction perpendicular to the permanent magnet of rotor element. The magnetic flux path ($\Phi$) 403 thus passes through the blade tip 304.

Further, it can be seen how the flux lines, $\Phi$, are aligned in a perpendicular direction to the chord line C-C at the tip region of the fan blade 301. Thus, relative to the axial, the flux lines are substantially oriented at an angle that is the complement of the stagger angle ($\zeta$) of the blade at its tip.

In the present embodiment, the first pole 401 of the permanent magnet is a north (N) pole and the second pole 402 of the magnet is a south (S) pole. The magnetic flux path ($\Phi$) 403 thus exits the blade on the suction side, and returns around the blade tip 403 to the pressure side of the blade.

It will be appreciated that the orientation of the magnet may be reversed with respect to the pressure and suction surfaces of the blade, with an attendant reversal of the flux path.

The permanent magnets that comprise the rotor elements 309 may be embedded into the fan blade 301. In an embodiment, this is achieved by filling in existing voids in hollow fan blades with permanent magnet powder, or alternatively by forming as part of the manufacture process of the blades.

Figure 5:
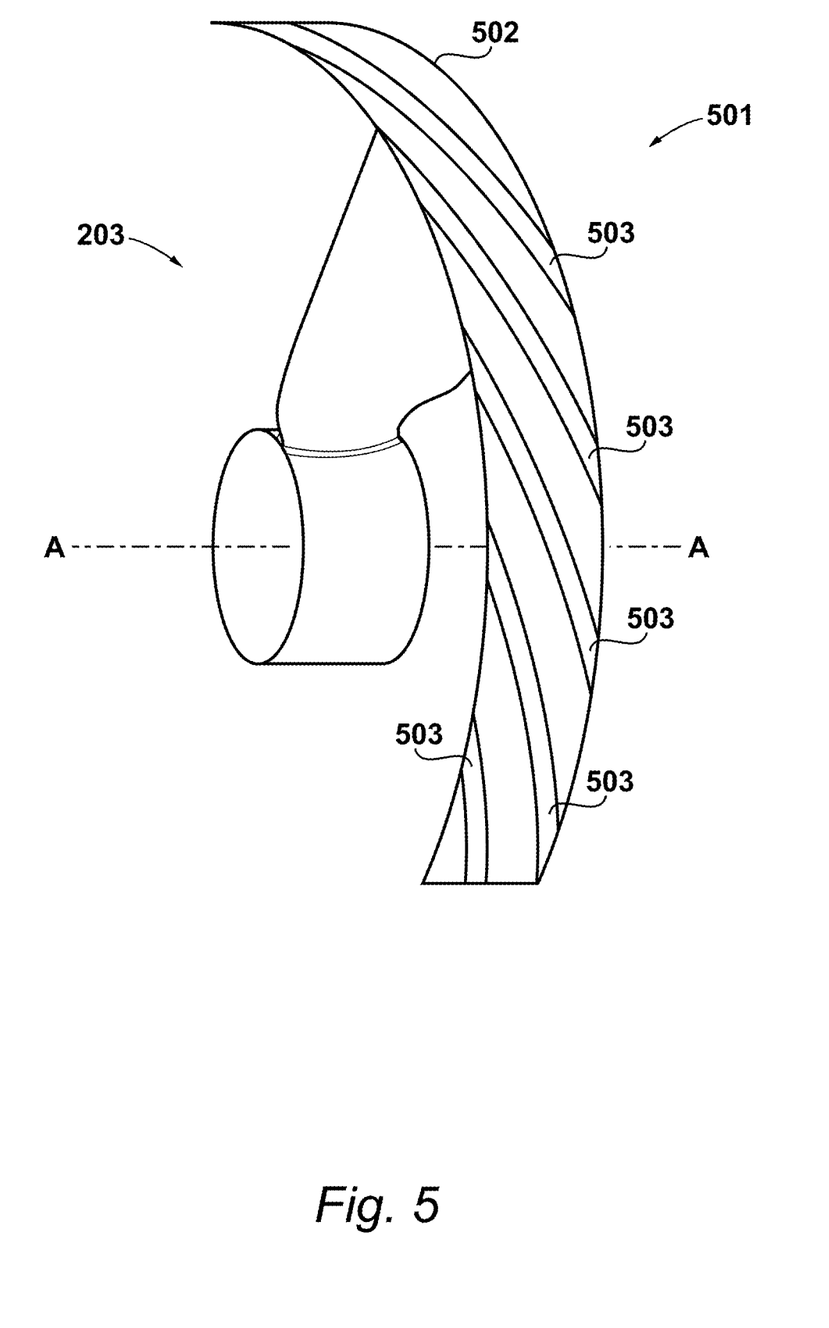
FIG. 5 shows the fan of FIG. 3 and the fan case comprising the stator of the electric machine.

The electric machine further comprises a stator 501, a portion of which is shown in FIG. 5. In this particular example, the stator 501 is integrated into a fan case 502 of the engine 201, which may be formed integrally as part of the engine nacelle 211. The stator 501 comprises a plurality of stator windings 503. The stator windings 503 may be formed of any appropriate conductive material, such as copper.

Electromagnetic torque generation and/or power generation is achieved by interaction of the magnetic field of the rotor elements 309 and stator conductors in the stator windings 503, as illustrated in FIG. 6. This arrangement means that no stator core is needed to capture and direct the flux lines, which results in a lighter weight and less bulky system.

The magnitude of the electromagnetic torque (τ) is proportionate to the flux density (B), which is a function of the flux linkage (Φ), electrical currents in the conductors of the stator windings (I), and the angle (θ) between the conductors and permanent magnet:

$$\tau \propto K \cdot B(\Phi) \cdot I \cdot \cos\theta \quad \text{[Equation 1]}$$

where K is a constant associated with geometrical constraints of the specific implementation.

Thus, in an embodiment, to maximize electromagnetic torque generation and/or power generation, the conductors within the stator windings 503 may be oriented to match the fan blade tip stagger angle (ζ). This will be better understood with reference to FIG. 7, which shows a cascade of blades from the fan 203 with the stator 501 overlaid thereon.

Figure 7:
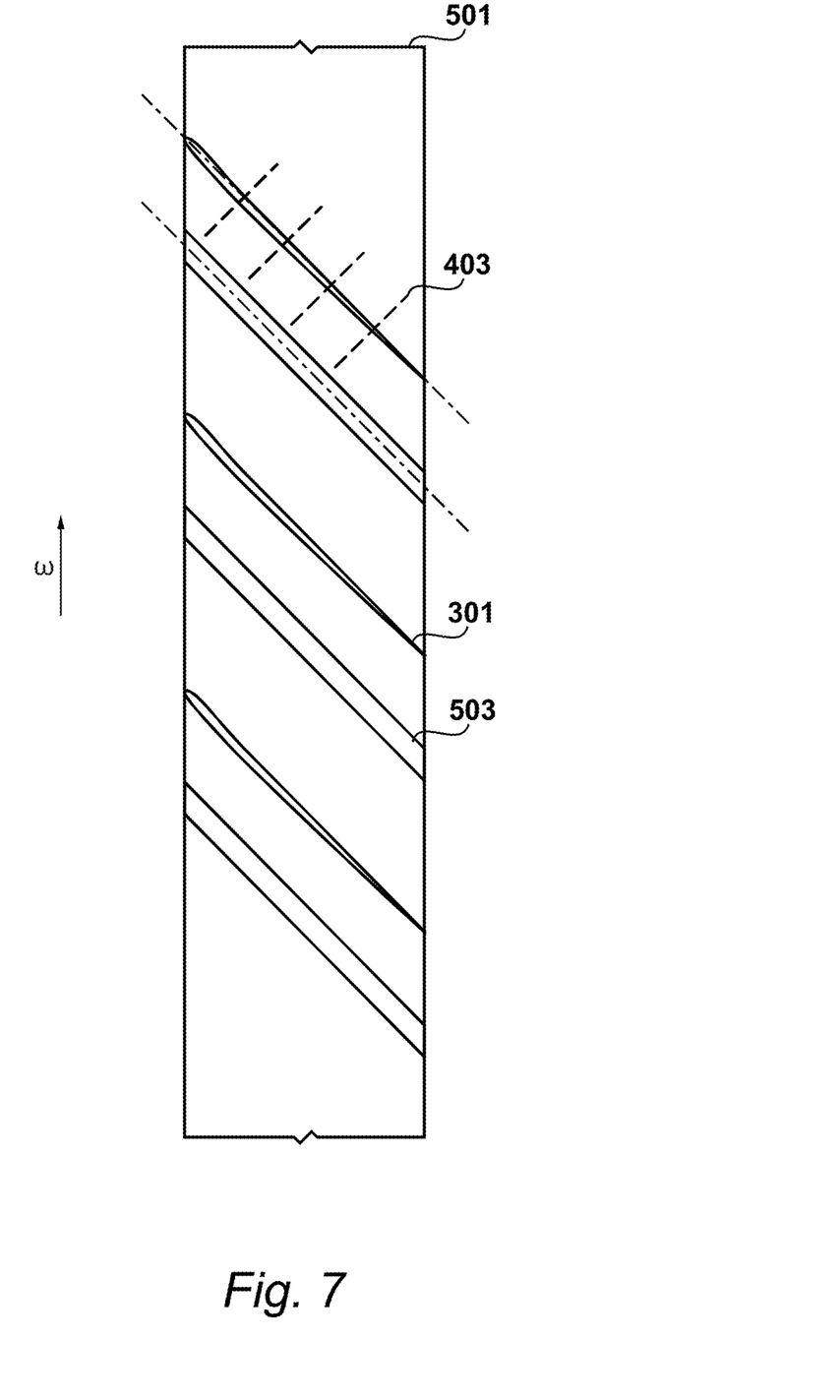
FIG. 7 shows a cascade of fan blades and their alignment with the stator windings in the fan case.

Recalling that the rotor elements 309 and thus the permanent magnets are aligned with the chord at the tip of the blades 301, the maximum torque τ will be produced when θ is zero. Thus, by setting the orientation of the stator windings 503 to match the stagger of the fan blades 301 at their tip, the maximum torque and/or power will be generated in use. This is particularly beneficial for the start regime.

Alternatively, the stator windings 503 may be oriented such that θ is ±5 degrees, ±10 degrees, ±20 degrees, or ±30 degrees. Such a configuration may be adopted for the at-rest configuration, with the aerodynamic untwist of the fan blades 301 in operation resulting in a transition to a lower value of θ during flight and thereby greater torque and/or generation.

Figure 8:
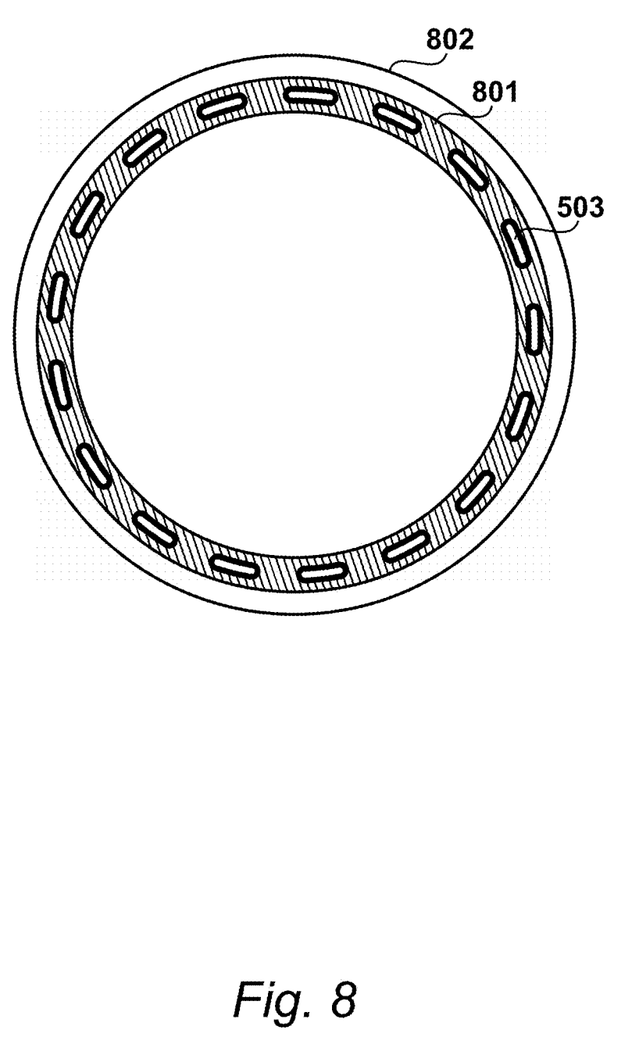
FIG. 8 shows a cross-sectional view of the fan case with integrated stator.

A cross-section of the fan case 502 is shown in FIG. 8. Instead of a conventional toothed stator structure with magnetic lamination to house the stator windings, in the present embodiment a non-magnetic former 801 to accommodate the stator windings 503 and a magnetic outer ring 802 to contain the magnetic field. The non-magnetic former may be made of a non-metallic composite such as PEEK, alumina, etc. The magnetic outer ring may be laminated to reduce the amount of iron losses.

Such a stator is lighter than a conventional toothed stator. Furthermore, the fact that there are no stator teeth to constrain the magnetic design of the electrical machine in terms of slot-pole configuration means that the electric machine can be integrated with turbomachine rotors having any number of blades. The fundamental electrical frequency ($f_e$) that will be required to be applied to the stator windings to drive the rotor is given by:

$$f_e = N_b \cdot \omega_m \quad \text{[Equation 2]}$$

where $N_b$ is the number of fan blades, and $\omega_m$ is the rotational speed of the fan in revolutions per second.

If desired however, a conventional toothed stator could be used instead. Such a toothed stator may still adopt the skewed windings that are oriented with the chord line of the tip of the fan blade 301, as described previously.

In practice, the electric machine 212 may operate as a starter, a generator, or as a starter-generator. In some embodiments it may also operate to augment the low-pressure turbine 209 in terms of driving the fan 203 during flight, with power being sourced either from energy storage on the aircraft or from another engine configured as a genset, for example.

Figure 9:
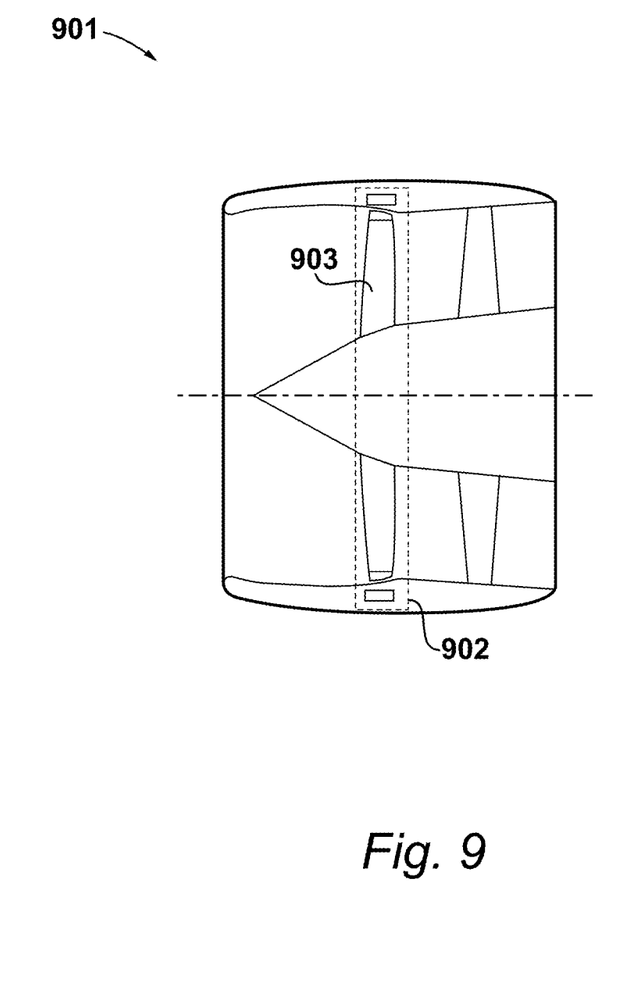
FIG. 9 shows an alternative embodiment of a propulsor incorporating an electric machine as set out above.

Referring now to FIG. 9, an electric machine of any of the embodiments described herein may also be used in an alternative configuration as part of an electric ducted fan 901, which is an alternative to the turbofan 201 as propulsor for producing thrust to propel an aircraft. The electric machine is identified as 902, and in such a configuration is the sole source of torque, and thereby drive, for a fan 903.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. An electric machine comprising:
   a turbomachine rotor having a hub and an axis of rotation about which the turbomachine rotor is arranged to rotate;
   a plurality of blades, each blade having a root attached to the hub, a tip remote from the hub, a leading edge and a trailing edge, a pressure side face and a suction side face;
   a plurality of rotor elements, each rotor element located at the tip of one of the plurality of blades; and
   a stator located circumferentially around the turbomachine rotor;
   wherein each rotor element comprises a permanent magnet having a first pole and a second pole, the first pole being located adjacent the suction side of the blade and the second pole being located adjacent the pressure side such that a magnetic flux path extends perpendicularly through the blade tip.

2. The electric machine of claim 1, wherein the first pole is a north pole and the second pole is a south pole, such that the magnetic flux path extends perpendicularly through the blade tip from the pressure side to the suction side.

3. The electric machine of claim 1, wherein each blade defines a chord line at the blade tip, and wherein each rotor element is located within its respective blade tip such that the magnetic flux lines due to the rotor element are perpendicular to the chord line at the blade tip.

4. The electric machine of claim 3, wherein the stator comprises a plurality of stator windings, and wherein each of the stator windings is aligned within ±30 degrees of the chord line at the blade tip.

5. The electric machine of claim 4, wherein each of the stator windings is parallel to the chord line at the blade tip.

6. The electric machine of claim 4, wherein the stator windings are wound around a non-magnetic former.

7. The electric machine of claim 1, further comprising a casing, and wherein the stator is located within the casing.

8. The electric machine of claim 1, further comprising a magnetic ring located circumferentially around the stator.

9. The electric machine of claim 1, wherein each rotor element is embedded within its respective blade such that the rotor element does not disrupt the aerodynamic shape of the blade.

10. The electric machine of claim 1, wherein each blade comprises a rotor element.

11. The electric machine of claim 1, wherein a rotor element comprises a permanent magnetic powder located within a void of a blade.

12. The electric machine of claim 1, wherein the turbomachine rotor is a fan in an aircraft engine.

13. The electric machine of claim 12, wherein the electric machine is operable to drive the fan.

14. The electric machine of claim 12, wherein the electric machine is operable to generate electricity from the fan.

15. A propulsor for producing thrust to propel an aircraft, the propulsor comprising an electric machine according to claim 1.

16. The propulsor of claim 15, in which the propulsor is a turbofan engine, and the turbomachine rotor within the electric machine forms the fan of the turbofan engine.

17. The propulsor of claim 15, in which the propulsor is an electric ducted fan, and the turbomachine rotor within the electric machine forms the fan thereof.

* * * * *